United States Patent
Lewandowski et al.

(10) Patent No.: US 12,077,156 B2
(45) Date of Patent: Sep. 3, 2024

(54) ADAPTIVE CRUISE CONTROL WITH LOAD

(71) Applicant: Ford Global Technologies, LLC, Dearborn, MI (US)

(72) Inventors: Andrew Denis Lewandowski, Sterling Heights, MI (US); Jordan Barrett, Milford, MI (US); Brendan Francis Diamond, Grosse Pointe, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 17/747,285

(22) Filed: May 18, 2022

(65) Prior Publication Data
US 2023/0373479 A1 Nov. 23, 2023

(51) Int. Cl.
*B60W 30/14* (2006.01)
*B60W 30/16* (2020.01)

(52) U.S. Cl.
CPC ........ *B60W 30/143* (2013.01); *B60W 30/162* (2013.01); *B60W 2530/10* (2013.01); *B60W 2540/18* (2013.01); *B60W 2540/221* (2020.02); *B60W 2552/30* (2020.02); *B60W 2554/802* (2020.02); *B60W 2555/60* (2020.02)

(58) Field of Classification Search
CPC ......... B60W 2530/10; B60W 2540/18; B60W 2540/221; B60W 2552/30; B60W 2554/802; B60W 2555/60; B60W 30/143; B60W 30/16; B60W 30/162
See application file for complete search history.

(56) References Cited

U.S. PATENT DOCUMENTS

| | | |
|---|---|---|
| 7,873,452 B2 | 1/2011 | Hawkins et al. |
| 9,050,982 B2 | 6/2015 | Pietron et al. |
| 2009/0132142 A1* | 5/2009 | Nowak ................ B60K 31/047 701/96 |
| 2012/0283928 A1* | 11/2012 | Bjernetun ......... B60W 50/0097 701/93 |
| 2016/0082962 A1* | 3/2016 | Dolesh ............... B60W 30/143 701/93 |
| 2017/0080932 A1* | 3/2017 | Canale .................... G06F 16/23 |
| 2020/0247423 A1 | 8/2020 | Almahmoud et al. |
| 2022/0219691 A1* | 7/2022 | Maleki .................. G06F 11/079 |
| 2022/0314990 A1* | 10/2022 | Han ....................... B60W 40/08 |

FOREIGN PATENT DOCUMENTS

EP 1346869 A3 1/2006

* cited by examiner

*Primary Examiner* — Isaac G Smith
*Assistant Examiner* — Jennifer M Anda
(74) *Attorney, Agent, or Firm* — Frank A. Mackenzie; Bejin Bieneman PLC (57) ABSTRACT

A computer includes a processor and a memory, and the memory stores instructions executable by the processor to determine that a vehicle is carrying a load; in response to an activation of an adaptive cruise control while the vehicle is carrying the load, operate the adaptive cruise control according to a set of parameters, the parameters being based on the load; while the adaptive cruise control is inactive and the vehicle is carrying the load, determine an expected operation of the adaptive cruise control, the expected operation being how the adaptive cruise control would operate according to the set of the parameters if active; and adjust at least one of the parameters based on a comparison of the expected operation with an actual operation performed by an operator of the vehicle.

20 Claims, 3 Drawing Sheets

ADAPTIVE CRUISE CONTROL WITH LOAD

BACKGROUND

Motor vehicles are sometimes used to tow trailers. A trailer is an unpowered vehicle outfitted to be towed by a powered vehicle. A trailer can be unpowered by lacking a propulsion or can be temporarily unpowered, e.g., by being in a neutral gear. Trailers can be used to transport goods, provide living space, etc.

DETAILED DESCRIPTION

This disclosure relates to dynamically optimizing performance of an adaptive cruise control system of a vehicle for when the vehicle is carrying a load, e.g., towing a trailer. A computer onboard the vehicle can be programmed to, in response to an activation of the adaptive cruise control while the vehicle is carrying the load, operate the adaptive cruise control according to a set of parameters. The parameters can include, e.g., a following distance, a time before an upcoming change in the posted speed limit to begin accelerating or decelerating the vehicle, a time before a turn to begin decelerating the vehicle, a target speed through the turn, a time before the turn ends to begin accelerating the vehicle, etc. The parameters can be based on the load, e.g., at least some of the parameters can change based on the amount of the load. To dynamically change the performance of the adaptive cruise control, the computer can be programmed to, while the adaptive cruise control is inactive and the vehicle is carrying the load, determine an expected operation of the adaptive cruise control. The expected operation is how the adaptive cruise control, if it were active, would operate at that time according to the parameters. Then, the computer can adjust at least one of the parameters based on a comparison of the expected operation with an actual operation performed by an operator of the vehicle at the same time. For example, if the operator brakes the vehicle a longer time before an upcoming curve, the computer can increase the parameter of time before a turn to begin decelerating the vehicle. After the adjustment, the computer can operate the adaptive cruise control according to the adjusted parameters, thus changing the performance of the adaptive cruise control.

A computer includes a processor and a memory, and the memory stores instructions executable by the processor to determine that a vehicle is carrying a load; in response to an activation of an adaptive cruise control while the vehicle is carrying the load, operate the adaptive cruise control according to a set of parameters, the parameters being based on the load; while the adaptive cruise control is inactive and the vehicle is carrying the load, determine an expected operation of the adaptive cruise control, the expected operation being how the adaptive cruise control would operate according to the set of the parameters if active; and adjust at least one of the parameters based on a comparison of the expected operation with an actual operation performed by an operator of the vehicle.

The instructions may further include instructions to, in response to the activation of the adaptive cruise control while the vehicle is not carrying the load, operate the adaptive cruise control according to a set of baseline parameters, and the baseline parameters may be at least partially different than the parameters.

The instructions may further include instructions to determine an amount of the load, and the parameters may be based on the amount of the load.

The instructions may further include instruction to determine an expected path for the vehicle to follow, and operating the adaptive cruise control may be based on the expected path. The expected path may include a turn of the vehicle, and the parameters may include a time relative to the turn to start decelerating the vehicle from a target speed into the turn. The time relative to the turn to start decelerating the vehicle may be earlier when the vehicle is carrying the load than when the vehicle is not carrying the load.

The expected path may include a turn of the vehicle, and the parameters may include a time relative to the turn to start accelerating the vehicle to a target speed out of the turn. The time relative to the turn to start accelerating the vehicle may be earlier when the vehicle is carrying the load than when the vehicle is not carrying the load.

The expected path may include a turn of the vehicle, and operating the adaptive cruise control according to the set of the parameters may include determining a target turn speed for the turn based on the load and on the parameters. The instructions may further include instructions to determine an amount of the load, and the target turn speed may be based on the amount of the load.

The expected path may include a radius of the turn, and the target turn speed is based on the radius of the turn.

The parameters may include a following distance between the vehicle and a leading vehicle in front of the vehicle.

The parameters may include a time relative to a change in a posted speed limit to start accelerating the vehicle. The time relative to the change in the posted speed limit to start accelerating the vehicle may be earlier when the vehicle is carrying the load than when the vehicle is not carrying the load.

The load may include a trailer.

The load may include cargo stored in the vehicle.

The instructions may further include instructions to adjust at least one of the parameters based on steering input received while the adaptive cruise control is active.

The instructions may further include instructions to transmit a message to a server remote from the vehicle based on the comparison of the expected operation with the actual operation.

The instructions may further include instructions to receive biometric data of the operator while the vehicle is carrying the load and operating the adaptive cruise control, and transmit a message to a server remote from the vehicle based on the biometric data.

A method includes determining that a vehicle is carrying a load; in response to an activation of an adaptive cruise control while the vehicle is carrying the load, operating the adaptive cruise control according to a set of parameters, the parameters being based on the load; while the adaptive cruise control is inactive and the vehicle is carrying the load, determining an expected operation of the adaptive cruise control, the expected operation being how the adaptive cruise control would operate according to the set of the parameters if active; and adjusting at least one of the parameters based on a comparison of the expected operation with an actual operation performed by an operator of the vehicle.

With reference to the Figures, wherein like numerals indicate like parts throughout the several views, a computer 105 includes a processor and a memory, and the memory stores instructions executable by the processor to determine that a vehicle 100 is carrying a load 200; in response to an activation of an adaptive cruise control while the vehicle 100 is carrying the load 200, operate the adaptive cruise control according to a set of parameters, the parameters being based on the load 200; while the adaptive cruise control is inactive and the vehicle 100 is carrying the load 200, determine an expected operation of the adaptive cruise control, the expected operation being how the adaptive cruise control would operate according to the set of the parameters if active; and adjust at least one of the parameters based on a comparison of the expected operation with an actual operation performed by an operator of the vehicle 100.

Figure 1:
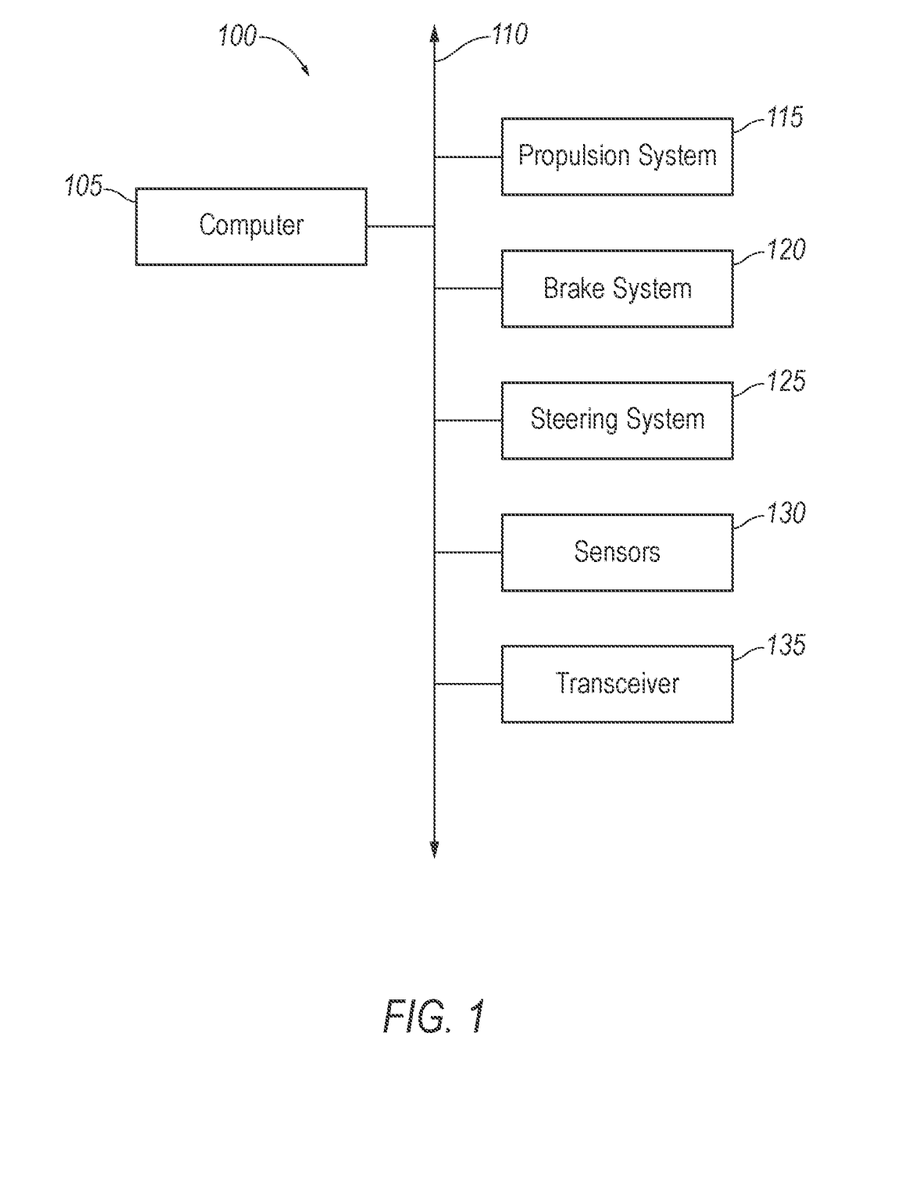
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to a propulsion system 115, a brake system 120, a steering system 125, sensors 130, a transceiver 135, and other components via the communications network 110.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

The sensors 130 may provide data about operation of the vehicle 100, for example, wheel speed, wheel orientation, and engine and transmission data (e.g., temperature, fuel consumption, etc.). The sensors 130 may detect the location and/or orientation of the vehicle 100. For example, the sensors 130 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 130 may detect the external world, e.g., objects and/or characteristics of surroundings of the vehicle 100, such as other vehicles, road lane markings, traffic lights and/or signs, pedestrians, etc. For example, the sensors 130 may include radar sensors, ultrasonic sensors, scanning laser range finders, light detection and ranging (LIDAR) devices, and image processing sensors such as cameras.

The transceiver 135 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 135 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 135 may be one device or may include a separate transmitter and receiver.

Figure 2:
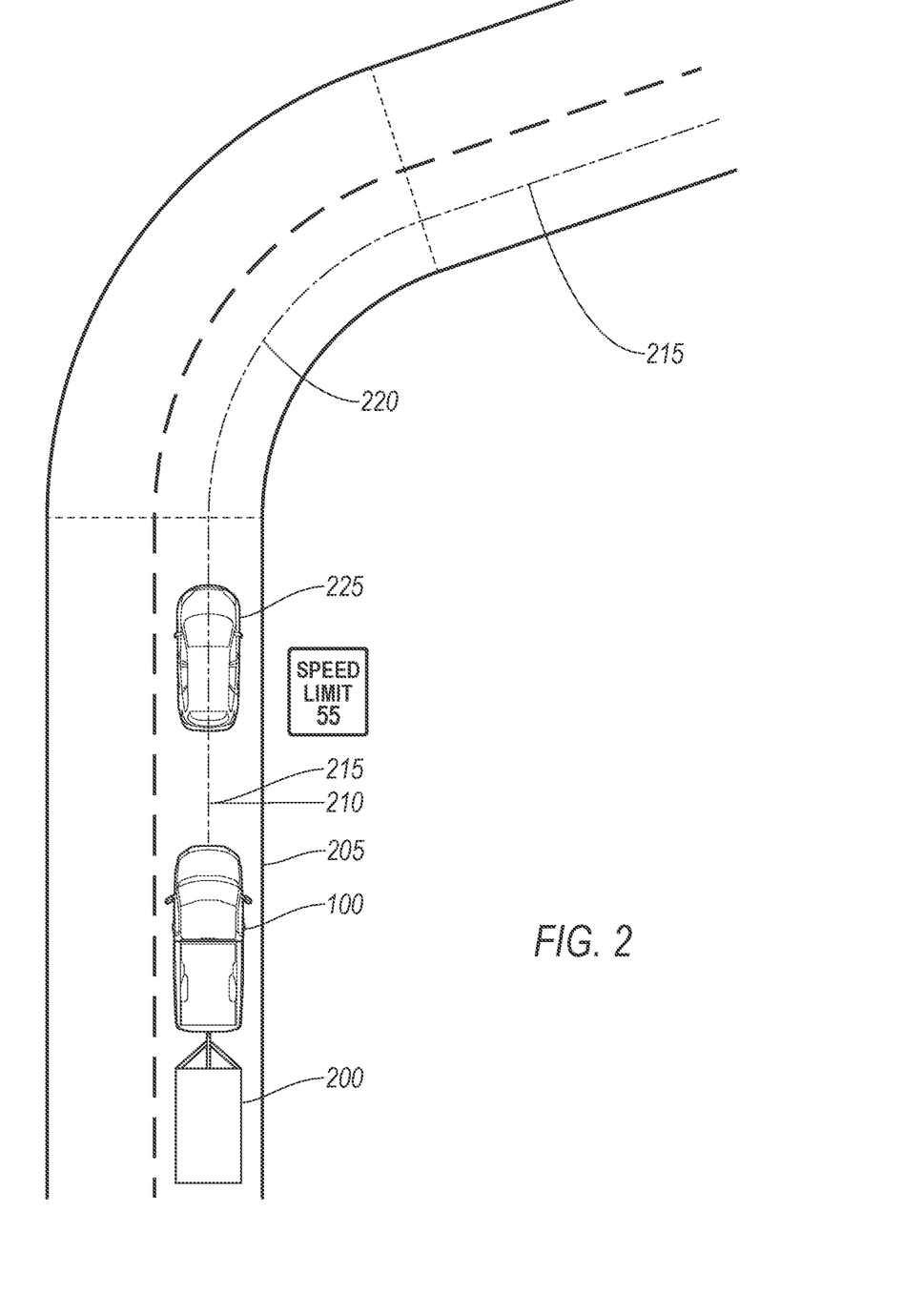
FIG. 2 is a diagrammatic top view of the vehicle towing a trailer along a road.

With reference to FIG. 2, the vehicle 100 can be carrying the load 200. For example, the load 200 can include cargo placed in the vehicle 100, e.g., in a bed of the vehicle 100. For another example, the load 200 can include a trailer towed by the vehicle 100. The trailer can be an unpowered vehicle outfitted to be towed by the vehicle 100. The trailer can be unpowered by lacking a propulsion or can be temporarily unpowered, e.g., by being in a neutral gear. The trailer can be used to transport goods, provide living space, etc. The trailer can be hitched to the vehicle 100. For example, the vehicle 100 and the trailer can be connected by a tow hitch, also referred to as a trailer hitch. The tow hitch can be any suitable type, e.g., a tow ball and socket, a fifth wheel and gooseneck, etc.

The computer 105 can be programmed to determine that the vehicle 100 is carrying the load 200 and to determine an amount of the load 200. The amount can be a weight. For example, if the load 200 is cargo placed in the vehicle 100, the computer 105 can receive data indicating a weight of the load 200 from the sensors 130, e.g., from a weight sensor for the bed, e.g., that is part of the suspension system. For another example, the computer 105 can receive data from, e.g., the propulsion system 115, indicating an acceleration resulting in a given speed, from which a weight of the load 200 can be inferred. For another example, the weight of the load 200 can be inputted by an operator of the vehicle 100, e.g., after using a weigh station.

The computer 105 can be programmed to determine an expected path 210 for the vehicle 100 to follow. For example, the computer 105 can determine the expected path 210 from map data and location data. The map data can be stored by the computer 105 or received via the transceiver 135. The location data can be received from a GPS sensor of the sensors 130. The computer 105 can determine that the vehicle 100 will follow a current road 205 at least until a next intersection. Alternatively or additionally, the computer 105 can determine or receive navigation data, e.g., a route determined by a navigation algorithm. The navigation data can indicate where the vehicle 100 will go at the next intersection. Alternatively or additionally, the computer 105 can store counts of which directions the vehicle 100 travels at specific intersections. The computer 105 can determine that, at a given intersection, the vehicle 100 will travel in the direction with the highest count.

The expected path 210 can include a sequence of positions or local paths. For example, the expected path 210 can include a sequence of straight-line segments 215 and turns 220. The straight-line segments 215 can include, e.g., a length and an orientation, or positions at each end of the straight-line segment 215, or equivalent data. The turns 220 can include, e.g., a length, a radius, and an orientation, or equivalent data. The turns 220 can be curves of the road 205 or intersections at which the vehicle 100 is expected to turn 220. The expected path 210 can include grades, i.e., angles upward or downward, for the straight-line segments 215 and turns 220.

The computer 105 can be programmed to operate the adaptive cruise control, i.e., to actuate the propulsion system 115 and the brake system 120 according to an adaptive-cruise-control algorithm stored on the computer 105. The computer 105 can be programmed to operate the adaptive cruise control according to the parameters of the adaptive cruise control. For example, the parameters can include a target speed and a following distance. The computer 105 can be programmed to, according to the adaptive cruise control, actuate the propulsion system 115 and/or the brake system 120 to maintain a speed of the vehicle 100 at the target speed and to accelerate up to the target speed. The computer 105 can be programmed to, according to the adaptive cruise control, vary the speed to maintain a distance from a leading vehicle 225 back to the vehicle 100 at the following distance when the leading vehicle 225 is traveling below the target speed. The following distance can be a function of the speed and/or of the target speed. The adaptive cruise control can be included within a driver-assist feature of the vehicle 100 that also includes one or more other semi- autonomous operations, e.g., lane-keeping assist or automatic lane changing.

The computer 105 can be programmed to activate the adaptive cruise control, i.e., to begin actuating the propulsion system 115 and the brake system 120 according to the adaptive-cruise-control algorithm, in response to receiving an input to activate the adaptive cruise control from the operator, e.g., via a user interface. The computer 105 can be programmed to deactivate the adaptive cruise control, i.e., to cease actuating the propulsion system 115 and the brake system 120 according to the adaptive-cruise-control algorithm, in response to receiving an input to deactivate the adaptive cruise control from the operator, e.g., via the user interface or via pressing the brake pedal. The computer 105 can lack programming to activate or deactivate the adaptive cruise control other than in response to inputs from the operator. Ultimate control over whether the adaptive cruise control is active can rest with the operator.

The parameters can include the target speed, the following distance, a rate of acceleration up to the target speed, a time relative to a change in a posted speed limit to start accelerating the vehicle 100, a time relative to the turn 220 to start decelerating the vehicle 100 from a target speed into the turn 220, a time relative to the turn 220 to start accelerating the vehicle 100 to the target speed out of the turn 220, a target turn speed for the turn 220, and/or others, as will be described below. The parameters can be set by the operator when activating or using the adaptive cruise control, can be stored in memory, and/or can be determined based on data received by the computer 105 according to a formula stored in memory. The computer 105 can be programmed to operate the adaptive cruise control based on the expected path 210. For example, some of the parameters can control operation relative to a turn 220 or a change in the posted speed limit, as will be described below.

The parameters can include the target speed. The computer 105 can be programmed to, according to the adaptive cruise control, actuate the propulsion system 115 and/or the brake system 120 to maintain a speed of the vehicle 100 at the target speed and to accelerate up to the target speed. The target speed can be an input from the operator. Alternatively or additionally, the computer 105 can determine the target speed from the posted speed limit, e.g., by setting the target speed to the posted speed limit. For example, the operator can select to input the target speed or to set the target speed to the posted speed limit. The computer 105 can determine the posted speed limit from map data that specifies the speed limits along segments of road 205 and from location data from the GPS sensor specifying which segment the vehicle 100 is on, and/or the computer 105 can determine the posted speed limit by applying text recognition to camera data showing a sign stating the posted speed limit.

The parameters can include a following distance between the vehicle 100 and the leading vehicle 225 in front of the vehicle 100. The computer 105 can be programmed to, according to the adaptive cruise control, vary the speed to maintain a distance from the leading vehicle 225 back to the vehicle 100 at the following distance when the leading vehicle 225 is traveling below the target speed. The following distance can be a function of the speed and/or of the target speed.

The parameters can include a target turn speed for turns 220. The computer 105 can be programmed to determine the target turn speed based on the load 200, e.g., the amount of the load 200; the radius of the turn 220; and/or the posted speed limit, which may be different for the turn 220 than for the rest of the road 205. The target turn speed can be slower for larger loads 200, smaller radii, and lower posted speed limits. For example, the computer 105 can store a lookup table providing the target turn speed. The values for the lookup table can be chosen based on what speeds will ensure a stable turn 220 without skidding or tipping. For another example, the computer 105 can store a maximum lateral acceleration and calculate the target turn speed that ensures that the vehicle will not exceed the maximum lateral acceleration based on the radius of the turn 220, e.g., $v=\sqrt{ar}$, in which v is the speed, a is the maximum lateral acceleration, and r is the radius of the turn 220. The maximum lateral acceleration can vary based on the amount of the load 200, e.g., as a function of the combined weight of the vehicle 100 and the load 200. The speed according to the lookup table or the calculation can then be capped at the posted speed limit for the turn 220 if the posted speed limit is lower.

The parameters can include times to begin accelerating relative to a change in the expected path 210, e.g., a time relative to a change in the posted speed limit to start (positively or negatively) accelerating the vehicle 100 from an old target speed to a new target speed, a time relative to a turn 220 to start decelerating the vehicle 100 from the target speed into the turn 220 to the target turn speed, a time relative to the turn 220 to start positively accelerating the vehicle 100 from the target turn speed to the target speed out of the turn 220, a time relative to a change in grade to start accelerating or decelerating the vehicle 100 from the target speed (e.g., decelerating via engine braking), etc. The time relative to the change can be an amount of time before or after the vehicle 100 encounters the change, e.g., ten seconds before the change, two seconds after the change, etc. The computer 105 can be programmed to, according to the adaptive cruise control, determine the time at which the vehicle 100 will encounter the change based on the speed and the expected path 210 and to actuate the propulsion system 115 and/or the brake system 120 to accelerate or decelerate the vehicle 100 starting at the time relative to the change. The computer 105 can store the times in memory.

The parameters can include baseline parameters and loaded parameters. The baseline parameters are the parameters governing the adaptive cruise control when the vehicle 100 is not carrying the load 200. The loaded parameters are the parameters governing the adaptive cruise control when the vehicle 100 is carrying the load 200. The baseline parameters can be at least partially different than the loaded parameters. The loaded parameters can depend on the amount of the load 200, and/or different sets of the loaded parameters can govern the adaptive cruise control based on the amount of the load 200. For example, the computer 105 can store sets of the loaded parameters with the sets sorted into the type of the load 200 (in-bed cargo or trailer) and ranges of the amount, e.g., weight, of the load 200, as in the example table. The loaded parameters can be stored as multipliers or differences from the corresponding baseline parameters, e.g., for a maximum weight trailer, the maximum lateral acceleration (used to determine the target turn speed, as described above) is 0.625 of the baseline maximum lateral acceleration, and for an 8000lb trailer, the deceleration into a turn 220 or decrease in posted speed limit occurs 3 seconds earlier than the baseline time to start decelerating.

| Weight | Max Lateral Acc. | Acc. Out of Turn | Acc. Increased Speed Limit | Dec. into Turn, Decreased Speed Limit | Grade Compensation |
|---|---|---|---|---|---|
| No/light load | 1 | Baseline | Baseline | Baseline | Baseline |
| <1000 lb cargo | 1 | +0 | +0 | +0 | +0 |
| <2000 lb cargo | 1 | +0 | +0 | +0 | +0 |
| <Max cargo | 1 | +0 | +0 | +0 | +0 |

-continued

| Weight | Max Lateral Acc. | Acc. Out of Turn | Acc. Increased Speed Limit | Dec. into Turn, Decreased Speed Limit | Grade Compensation |
|---|---|---|---|---|---|
| <3000 lb trailer | 1 | +0 | +0 | −2 s | +0 |
| <5000 lb trailer | 1 | +0 | +0 | −2 s | +0 |
| <7000 lb trailer | 1 | −1 s | +0 | −2 s | +0 |
| <9000 lb trailer | 1 | −1 s | +0 | −3 s | −1 s |
| <Max trailer | 0.625 | −1 s | +0 | −4 s | −1 s |

The loaded parameters can be based on the load 200, e.g., based on the presence of the load 200 and/or the amount of the load 200. For example, the target turn speed can be based on the amount of the load 200, as described above. For another example, the time relative to the turn 220 to start decelerating the vehicle 100 can be earlier when the vehicle 100 is carrying the load 200 than when the vehicle 100 is not carrying the load 200. For another example, the time relative to the turn 220 to start accelerating the vehicle 100 can be earlier when the vehicle 100 is carrying the load 200 than when the vehicle 100 is not carrying the load 200. For another example, the time relative to the change in the posted speed limit to start accelerating the vehicle 100 can be earlier when the vehicle 100 is carrying the load 200 than when the vehicle 100 is not carrying the load 200.

The computer 105 can be programmed to, when the adaptive cruise control is inactive, determine an expected operation of the adaptive cruise control. The expected operation is how the adaptive cruise control would operate according to the set of the parameters (baseline or loaded parameters, as appropriate) if active. The expected operation can be a rate of acceleration or deceleration and a time at which the rate of acceleration or deceleration occurs. The computer 105 can determine the expected operation based on the adaptive-cruise-control algorithm stored on the computer 105 in the same manner as operating the adaptive cruise control.

The computer 105 can be programmed to, when the adaptive cruise control is inactive, compare the expected operation with an actual operation. The actual operation is the actuation of the propulsion system 115 and/or the brake system 120 by the operator to accelerate or decelerate the vehicle 100. The actual operation can be a rate of acceleration or deceleration and a time at which the rate of acceleration or deceleration occurs. The comparison can include a relative time between the beginning of the expected operation and the actual operation, and a difference in rate of acceleration between the expected operation and the actual operation. As will be described below, the comparison can be used to adjust the parameters.

The computer 105 can be programmed to, while the adaptive cruise control is active, receive a steering input from the steering system 125. The steering input can be values of a steering-wheel angle of the steering wheel over time. The computer 105 can determine a frequency and/or an amplitude of the steering input, e.g., whether the steering input was shaky or smooth. As will be described below, the steering input can be used to adjust the parameters.

The computer 105 can be programmed to, while the adaptive cruise control is active, receive biometric data of the operator. The biometric data can be usable to indicate discomfort, anxiety, or nervousness. For example, the biometric data can include heart rate, breathing rate, pupil dilation, etc. For example, the computer 105 can receive the biometric data from a camera of the sensors 130 that is aimed at the operator, e.g., for pupil dilation and/or breathing rate. For another example, the computer 105 can receive the biometric data from a wearable device of the operator that is synched with the computer 105, e.g., via the transceiver 135, e.g., for heart rate.

The computer 105 can be programmed to adjust at least one of the parameters, e.g., at least one of the baseline parameters or loaded parameters, based on feedback data. The feedback data can be, e.g., the comparison of the expected operation with the actual operation, the steering input, and/or the biometric data. The computer 105 can adjust the baseline parameters based on the feedback data gathered when the vehicle 100 is not carrying a load 200, and the computer 105 can adjust the loaded parameters for a given weight range based on the feedback data gathered when the vehicle 100 is carrying a load 200 with an amount in the weight range.

For example, the computer 105 can be programmed to adjust at least one of the parameters based on the comparison of the expected operation with the actual operation performed by the operator of the vehicle 100. The computer 105 can, e.g., increase the time before a turn 220 to begin slowing the vehicle 100 in response to the actual operation including braking earlier than the expected operation, or vice versa. Alternatively or additionally, the computer 105 can, e.g., count a number of times that the actual operation includes braking earlier than the expected operation, and increase the time before the turn 220 to begin slowing in response to the number exceeding a threshold. The threshold can be chosen to be low enough to be likely to be exceeded in a single trip of the vehicle 100 and high enough to be unlikely to be coincidental rather than intentional, e.g., five.

For another example, the computer 105 can be programmed to adjust at least one of the parameters based on the steering input received while the adaptive cruise control is active. The computer 105 can, e.g., decrease a target turn speed, increase the time before a turn 220 to begin slowing the vehicle 100, etc. in response to the steering input indicating shaky steering through a turn 220, e.g., by having a frequency above a threshold. The threshold can be chosen to indicate uncertain operation by the operator. Alternatively or additionally, the computer 105 can, e.g., count a number of times that the steering input indicates shaky steering through a turn 220, and decrease the target turn speed, etc. in response to the number exceeding a threshold. The threshold can be chosen to be low enough to be likely to be exceeded in a single trip of the vehicle 100 and high enough to be unlikely to be coincidental rather than intentional, e.g., five.

For another example, the computer 105 can be programmed to adjust at least one of the parameters based on the biometric data while the adaptive cruise control is active. The computer 105 can, e.g., decrease a target turn speed, increase the time before a turn 220 to begin slowing the vehicle 100, etc. in response to the biometric data including the heart rate above a threshold, the breathing rate above a threshold, the pupil dilation above a threshold, etc. The thresholds can be chosen to indicate discomfort by the operator. Alternatively or additionally, the computer 105 can, e.g., count a number of times that the biometric data exceeds one of the thresholds, and decrease the target turn speed, etc. in response to the number exceeding a threshold. The threshold can be chosen to be likely to be exceeded in a single trip of the vehicle 100 and high enough to be unlikely to be coincidental rather than intentional, e.g., five.

The computer 105 can be programmed to transmit a message to a server remote from the vehicle 100, e.g., via the transceiver 135, based on the feedback data, e.g., based on the comparison of the expected operation with the actual operation, the steering input, and/or the biometric data. For example, the message can include the feedback data. The server can be, e.g., associated with a manufacturer or fleet owner of a plurality of the vehicles 100 and can aggregate the feedback data from the plurality of the vehicles 100. The computer 105 can be programmed to transmit the message in response to one of the conditions for adjusting the parameters described immediately above, e.g., the actual operation including braking earlier than the expected operation at least five times.

The computer 105 can be programmed to receive updated parameters from the server remote from the vehicle 100, e.g., via the transceiver 135. For example, the updated parameters can be chosen based on the aggregated feedback data from the plurality of the vehicles 100 and broadcast to the plurality of the vehicles 100. The computer 105 can store the updated parameters in memory and can then operate the adaptive cruise control according to the updated parameters in the manner described above.

The computer 105 can be programmed to, while the adaptive cruise control is active, transmit a vehicle-to-vehicle message to nearby vehicles indicating the expected operations of the vehicle 100. The other vehicles can potentially use the expected operations to plan their motion, e.g., another vehicle that is behind the vehicle 100 braking when the expected operation of the vehicle 100 includes decelerating.

Figure 3:
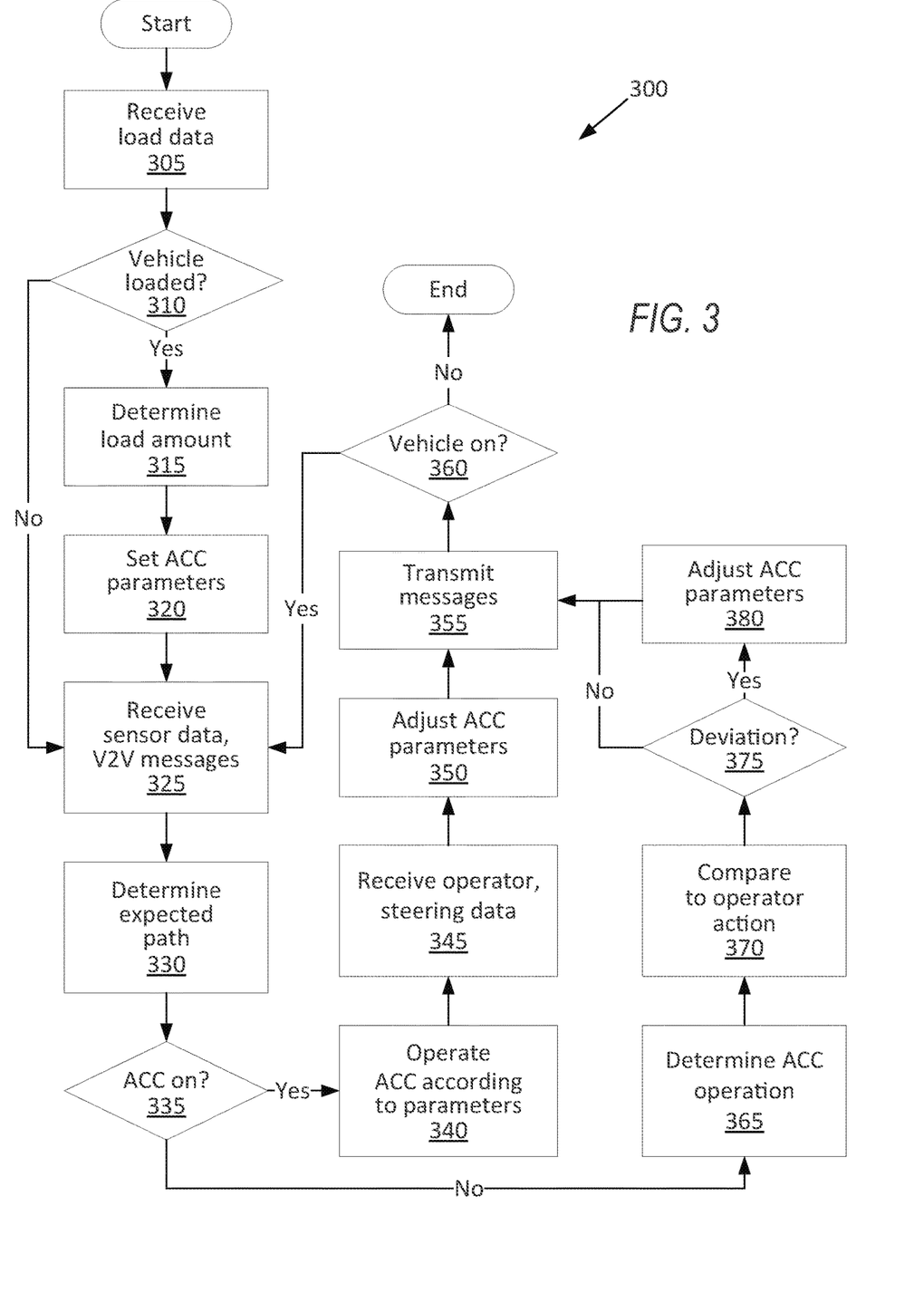
FIG. 3 is a process flow diagram of an example process for controlling an adaptive cruise control of the vehicle.

FIG. 3 is a process flow diagram illustrating an exemplary process 300 for controlling the adaptive cruise control of the vehicle 100. The memory of the computer 105 stores executable instructions for performing the steps of the process 300 and/or programming can be implemented in structures such as mentioned above. As a general overview of the process 300, the computer 105 determines whether the vehicle 100 is loaded and the amount of the load 200 and sets the parameters of the adaptive cruise control accordingly. The computer 105 determines the expected path 210. If the adaptive cruise control is active, the computer 105 operates the adaptive cruise control, receives the steering input and the biometric data, adjusts the parameters based on the steering input and the biometric data, and transmits messages to the server and to other vehicles. If the adaptive cruise control is inactive, the computer 105 determines the expected operation and compares the expected operation to the actual operation. If the comparison indicates a deviation, the computer 105 adjusts the parameters based on the comparison. The computer 105 transmits messages to the server and/or the other vehicles. The process 300 continues for as long as the vehicle 100 remains on.

The process 300 begins in a block 305, in which the computer 105 receives the data indicating the presence and/or amount of the load 200, as described above.

Next, in a decision block 310, the computer 105 determines whether the vehicle 100 is carrying the load 200. In response to the vehicle 100 carrying the load 200, the process 300 proceeds to a block 315. In response to the vehicle 100 not carrying a load 200, the process 300 proceeds to a block 325.

In the block 315, the computer 105 determines the amount of the load 200, as described above.

Next, in a block 320, the computer 105 sets the parameters according to the presence and/or the amount of the load 200, e.g., by selecting the baseline parameters or the set of loaded parameters for the weight range encompassing the amount of the load 200, as described above. After the block 320, the process 300 proceeds to the block 325.

In the block 325, the computer 105 receives data from the sensors 130, map data, etc.

Next, in a block 330, the computer 105 determines the expected path 210 for the vehicle 100 to follow, as described above.

Next, in a decision block 335, the computer 105 determines whether the adaptive cruise control is active or inactive. The adaptive cruise control can be activated or deactivated by an input from the operator, as described above. In response to the activation of the adaptive cruise control or to the adaptive cruise control already being active without a deactivation input, the process 300 proceeds to a block 340. In response to the deactivation of the adaptive cruise control or to the adaptive cruise control already being inactive without an activation input, the process 300 proceeds to a block 365.

In the block 340, the computer 105 operates the adaptive cruise control according to the parameters set in the block 320, e.g., the baseline parameters if the vehicle 100 is not carrying a load 200 or one of the sets of the loaded parameters if the vehicle 100 is carrying the load 200, as described above.

Next, in a block 345, the computer 105 receives the steering input and the biometric data of the operator, as described above.

Next, in a block 350, the computer 105 adjusts at least one of the parameters set in the block 320 based on the steering input and/or the biometric data if indicated by the steering input or the biometric data, as described above.

Next, in a block 355, the computer 105 transmits a message to the server based on the feedback data if indicated by the feedback data, as described above. The computer 105 transmits a vehicle-to-vehicle message to nearby vehicles, as described above.

Next, in a decision block 360, the computer 105 determines whether the vehicle 100 is still on. If so, the process 300 returns to the block 320 to continue monitoring data and operating the adaptive cruise control. If not, the process 300 ends.

In the block 365, the computer 105 determines the expected operation of the adaptive cruise control, as described above.

Next, in a block 370, the computer 105 compares the expected operation to the actual operation performed by the operator of the vehicle 100, as described above.

Next, in a block 375, the computer 105 determines whether the comparison from the block 370 indicates a sufficient deviation to adjust the parameters. For example, the computer 105 can determine whether a number of deviations exceeds a number threshold, as described above. For another example, the computer 105 can determine whether a difference in the time that the acceleration or deceleration began between the expected operation and the actual operation exceeds a time threshold. The time threshold can be chosen to be unlikely to be due to chance, e.g., at least one standard deviation. For another example, the computer 105 can determine whether a difference in the rate of acceleration between the expected operation and the actual operation exceeds an acceleration threshold. The acceleration threshold can be chosen to be unlikely to be due to change, e.g., at least one standard deviation. If there is a sufficient deviation between the expected operation and the actual operation, the process 300 proceeds to a block 380. If not, the process 300 continues to the block 355 to transmit the messages and restart the process 300.

In the block 380, the computer 105 adjusts at least one of the parameters set in the block 320 based on the comparison of the expected operation with the actual operation, as described above. After the block 380, the process 300 continues to the block 355 to transmit the messages and restart the process 300.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, JavaTM, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   determine that a vehicle is carrying a load;
   in response to an activation of an adaptive cruise control while the vehicle is carrying the load, operate the adaptive cruise control according to loaded parameters, the loaded parameters being based on the load;
   while the adaptive cruise control is inactive and the vehicle is carrying the load, determine an expected operation of the adaptive cruise control, the expected operation being how the adaptive cruise control would operate according to the loaded parameters if active;
   while the adaptive cruise control is inactive, adjust at least one of the loaded parameters based on a comparison of the expected operation with an actual operation performed by an operator of the vehicle; and
   after adjusting at least one of the loaded parameters based on the comparison, in response to an activation of an adaptive cruise control while the vehicle is carrying the load, operate the adaptive cruise control according to the loaded parameters as adjusted.

2. The computer of claim 1, wherein the instructions further include instructions to, in response to the activation of the adaptive cruise control while the vehicle is not carrying the load, operate the adaptive cruise control according to baseline parameters, the baseline parameters being at least partially different than the loaded parameters.

3. The computer of claim 1, wherein the instructions further include instructions to determine an amount of the load, and the loaded parameters are based on the amount of the load.

4. The computer of claim 1, wherein the instructions further include instructions to determine an expected path for the vehicle to follow, and operating the adaptive cruise control is based on the expected path.

5. The computer of claim 4, wherein the expected path includes a turn of the vehicle, and the loaded parameters include a time relative to the turn to start accelerating the vehicle to a target speed out of the turn.

6. The computer of claim 5, wherein the time relative to the turn to start accelerating the vehicle is earlier when the vehicle is carrying the load than when the vehicle is not carrying the load.

7. The computer of claim 4, wherein the expected path includes a turn of the vehicle, and operating the adaptive cruise control according to the loaded parameters includes determining a target turn speed for the turn based on the load and on the loaded parameters.

8. The computer of claim 7, wherein the instructions further include instructions to determine an amount of the load, and the target turn speed is based on the amount of the load.

9. The computer of claim 7, wherein the expected path includes a radius of the turn, and the target turn speed is based on the radius of the turn.

10. The computer of claim 4, wherein the expected path includes a turn of the vehicle, and the loaded parameters include a time relative to the turn to start decelerating the vehicle from a target speed into the turn.

11. The computer of claim 10, wherein the time relative to the turn to start decelerating the vehicle is earlier when the vehicle is carrying the load than when the vehicle is not carrying the load.

12. The computer of claim 1, wherein the loaded parameters include a following distance between the vehicle and a leading vehicle in front of the vehicle.

13. The computer of claim 1, wherein the loaded parameters include a time relative to a change in a posted speed limit to start accelerating the vehicle.

14. The computer of claim 13, wherein the time relative to the change in the posted speed limit to start accelerating the vehicle is earlier when the vehicle is carrying the load than when the vehicle is not carrying the load.

15. The computer of claim 1, wherein the load includes a trailer.

16. The computer of claim 1, wherein the load includes cargo stored in the vehicle.

17. The computer of claim 1, wherein the instructions further include instructions to adjust at least one of the loaded parameters based on steering input received while the adaptive cruise control is active.

18. The computer of claim 1, wherein the instructions further include instructions to transmit a message to a server remote from the vehicle based on the comparison of the expected operation with the actual operation.

19. The computer of claim 1, wherein the instructions further include instructions to receive biometric data of the operator while the vehicle is carrying the load and operating the adaptive cruise control, and transmit a message to a server remote from the vehicle based on the biometric data.

20. A method comprising:
   determining that a vehicle is carrying a load;
   in response to an activation of an adaptive cruise control while the vehicle is carrying the load, operating the adaptive cruise control according to loaded parameters, the loaded parameters being based on the load;
   while the adaptive cruise control is inactive and the vehicle is carrying the load, determining an expected operation of the adaptive cruise control, the expected operation being how the adaptive cruise control would operate according to the loaded parameters if active;
   while the adaptive cruise control is inactive, adjusting at least one of the loaded parameters based on a comparison of the expected operation with an actual operation performed by an operator of the vehicle; and
   after adjusting at least one of the loaded parameters based on the comparison, in response to an activation of an adaptive cruise control while the vehicle is carrying the load, operating the adaptive cruise control according to the loaded parameters as adjusted.

\* \* \* \* \*